United States Patent [19]

Bando

[11] Patent Number: 5,759,222

[45] Date of Patent: Jun. 2, 1998

[54] GLASS-PLATE WORKING APPARATUS

[75] Inventor: Shigeru Bando, Tokushima, Japan

[73] Assignee: Bando Kiko Co., Ltd., Tokushima, Japan

[21] Appl. No.: 722,201

[22] PCT Filed: Dec. 27, 1995

[86] PCT No.: PCT/JP95/02729

§ 371 Date: Oct. 15, 1996

§ 102(e) Date: Oct. 15, 1996

[87] PCT Pub. No.: WO96/26162

PCT Pub. Date: Aug. 29, 1996

[30] Foreign Application Priority Data

Feb. 24, 1996 [JP] Japan ................... 8-061942

[51] Int. Cl.⁶ .................................................. C03B 33/03
[52] U.S. Cl. .................. 65/174; 65/97; 65/105; 65/112; 83/879
[58] Field of Search .............. 65/174, 97, 105, 65/112; 83/879

[56] References Cited

U.S. PATENT DOCUMENTS 4,698,088 10/1987 Bando ........................ 65/174
5,301,867 4/1994 Bando ........................ 225/104

FOREIGN PATENT DOCUMENTS

| | | |
|---|---|---|
| 62-78123 | 4/1987 | Japan . |
| 3-69853 | 11/1991 | Japan . |
| 5-201737 | 8/1993 | Japan . |
| 6-24779 | 2/1994 | Japan . |

*Primary Examiner*—Donald E. Czaja
*Assistant Examiner*—Sean Vincent
*Attorney, Agent, or Firm*—Nixon & Vanderhye

[57] ABSTRACT

A glass-plate working apparatus includes: a glass plate carrying-in section; a main cut-line forming section disposed in proximity to the glass plate carrying-in section; a glass plate bend-breaking section disposed in proximity to the main cut-line forming section; a glass plate peripheral-edge grinding section disposed in proximity to the glass plate bend-breaking section; and a glass plate carrying-out section disposed in proximity to the glass plate peripheral-edge grinding section, wherein each of the main cut-line forming section, the glass plate bend-breaking section, and the glass plate peripheral-edge grinding section is arranged to concurrently process two glass plates.

7 Claims, 3 Drawing Sheets

GLASS-PLATE WORKING APPARATUS

TECHNICAL FIELD

The present invention relates to a glass-plate working apparatus for manufacturing, for example, window glass for an automobile, such as a front window, a side window, and a rear window, panes for buildings, and other glass plates of predetermined configurations by bend-breaking unworked plate glass into a given configuration and by grinding a bend-broken edge of the bend-broken glass plate.

BACKGROUND ART

Conventionally, in a conventional glass-plate working apparatus of this type, a glass-plate carrying-in section and a main cut-line forming section in proximity to the glass-plate carrying-in section are disposed. In this main cut-line forming section, a given main cut line for bend-breaking is formed on unworked plate glass, and then the unworked plate glass on which the main cut line for bend-breaking has been formed is transported to a glass plate bend-breaking section which is disposed in proximity to the main cut-line forming section. In the glass plate bend-breaking section, an edge cut line is formed on the unworked plate glass on which the main cut line has been formed. Subsequently, the unworked plate glass on which the main cut line and the edge cut line have been formed is subjected to bend-breaking. The bend-broken edge of the bend-broken glass plate is ground in a glass plate peripheral-edge grinding section which is disposed in proximity to the glass-plate bend-breaking section.

With the glass-plate working apparatus described above, since the formation of a main cut line, bend-breaking, and grinding are carried out with respect to one glass plate at a time in the main cut-line forming section, the glass plate bend-breaking section, and the glass plate peripheral-edge grinding section, respectively, it takes a relatively long working time, resulting in a decline in productivity.

The present invention has been devised in view of the above-described aspects, and its object is to provide a glass-plate working apparatus which is capable of concurrently effecting the formation of main cut lines, bend-breaking, and peripheral-edge grinding with respect to a multiplicity of glass plates, thereby making it possible to reduce the working time and improve productivity.

Another object of the present invention is to provide a glass-plate working apparatus which is capable of effecting a multiple operation in the bend-breaking section which requires a relatively long working time, thereby making it possible to further reduce the working time and improve productivity.

DISCLOSURE OF THE INVENTION

In accordance with the present invention, the above objects are attained by a glass-plate working apparatus comprising: a glass plate carrying-in section; a main cut-line forming section disposed in proximity to the glass plate carrying-in section; a glass plate bend-breaking section disposed in proximity to the main cut-line forming section; a glass plate peripheral-edge grinding section disposed in proximity to the glass plate bend-breaking section; and a glass plate carrying-out section disposed in proximity to the glass plate peripheral-edge grinding section, wherein each of the main cut-line forming section, the glass plate bend-breaking section, and the glass plate peripheral-edge grinding section is arranged to concurrently process at least two glass plates.

The glass-plate working apparatus may further comprise: a transporting device for concurrently transporting at least two glass plates from the glass plate carrying-in section to the main cut-line forming section, from the main cut-line forming section to the glass plate bend-breaking section, from the glass plate bend-breaking section to the glass plate peripheral-edge grinding section, and from the glass plate peripheral-edge grinding section to the glass plate carrying-out section, respectively. In this case, the transporting device is preferably so constructed as to transport the at least two glass plates arranged in series in a transporting direction, and the main cut-line forming section, the glass plate bend-breaking section, and the glass plate peripheral-edge grinding section are respectively arranged to concurrently process the at least two glass plates arranged in series in the transporting direction.

In a preferred example, the main cut-line forming section is provided with at least two main cut-line forming heads and a common moving device for relatively moving the at least two main cut-line forming heads with respect to the respective glass plates. Each of the main cut-line forming heads is provided with a cutter, preferably a cutter wheel, for forming a main cut line by coming into contact with the glass plate, and the main cut-line forming section in this case is provided with a common blade orienting device for orienting a blade of each of the cutters of the main cut-line forming heads in a main cut-line forming direction. The common blade orienting device may have a rotating device for rotating each of the main cut-line forming heads about an axis perpendicular to a plane of relative movement of each of the main cut-line forming heads with respect to the glass plate.

As a preferred example of the glass plate bend-breaking section, it is possible to cite one which is provided with at least two bend-breaking heads for the glass plates to be bend-broken, as well as a moving device for moving each of the bend-breaking heads in correspondence with a corresponding one of the glass plates to be bend-broken. Here, it is possible to cite as one example a glass plate bend-breaking section in which each of the bend-breaking heads has a cutter device for forming an edge cut line on the glass plate and a press-breaking device for press-breaking the glass plate along the main cut line and the edge cut line.

The glass plate peripheral-edge grinding section in one example is provided with at least two grinding heads and a common moving device for relatively moving the at least two grinding heads with respect to the glass plates. Each of the grinding heads is provided with a grinding wheel for grinding a bend-broken edge while coming into contact with the bend-broken edge of the glass plate while rotating. In the case where the grinding wheel is provided, the glass plate peripheral-edge grinding section has a center orienting device for orienting a center of rotation of each of the grinding wheels of the grinding heads in a tangential direction at a grinding point with respect to the glass plate. As a preferred example of this center orienting device, it is possible to cite one which has a common rotating device for rotating the grinding heads about an axis perpendicular to a plane of relative movement of the grinding heads with respect to the glass plate.

In the glass-plate working apparatus in accordance with the present invention, main cut lines are concurrently formed in the main cut-line forming section with respect to at least two glass plates from the glass plate carrying-in section. The at least two glass plates on which the main cut lines are formed are concurrently subjected to bend-breaking in the glass plate bend-breaking section. Edges of the bend-broken glass plates are concurrently subjected to grinding in the glass plate peripheral-edge grinding section, and are then transported to the glass plate carrying-out section.

Hereafter, a detailed description will be given of the present invention on the basis of preferred embodiments illustrated in the drawings. It should be noted that the present invention is not limited to these embodiments.

EMBODIMENTS

Figure 1:
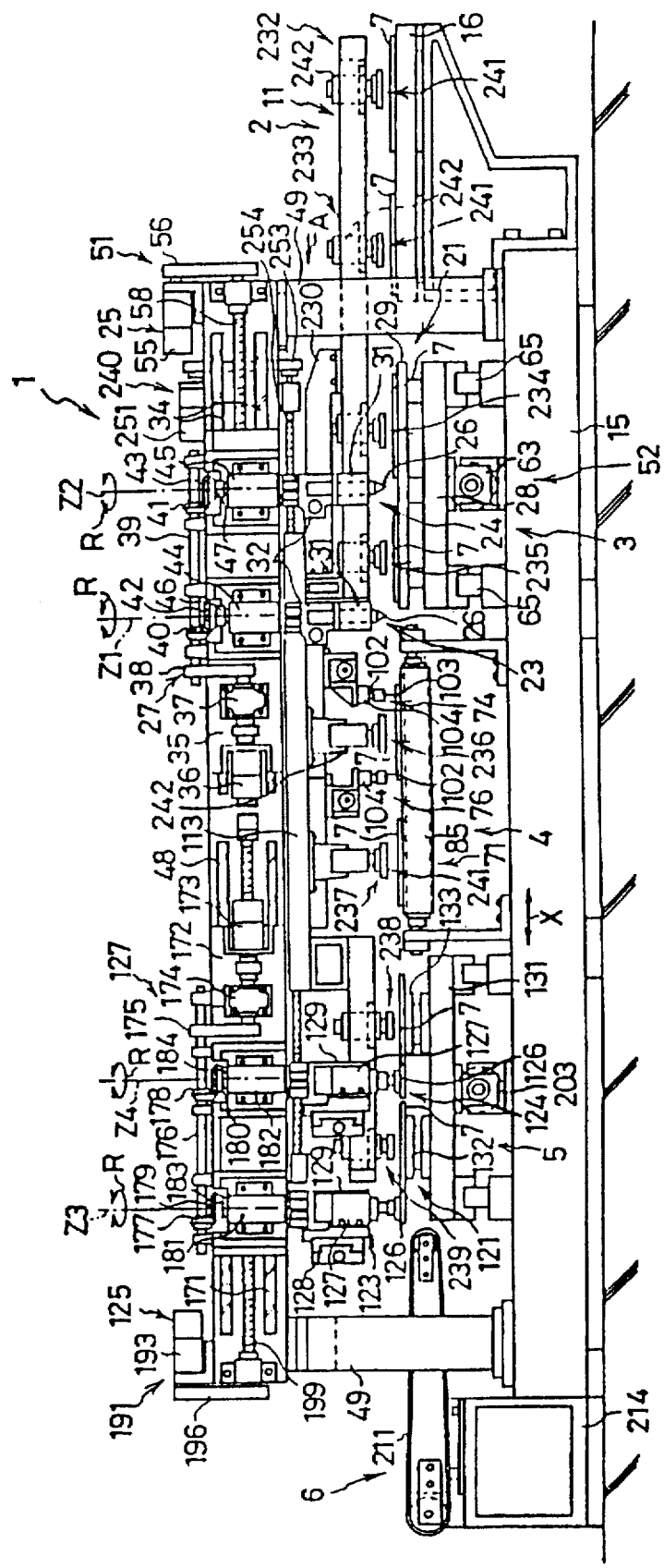
FIG. 1 is a front elevational view of a preferred embodiment of the present invention.
Figure 2:
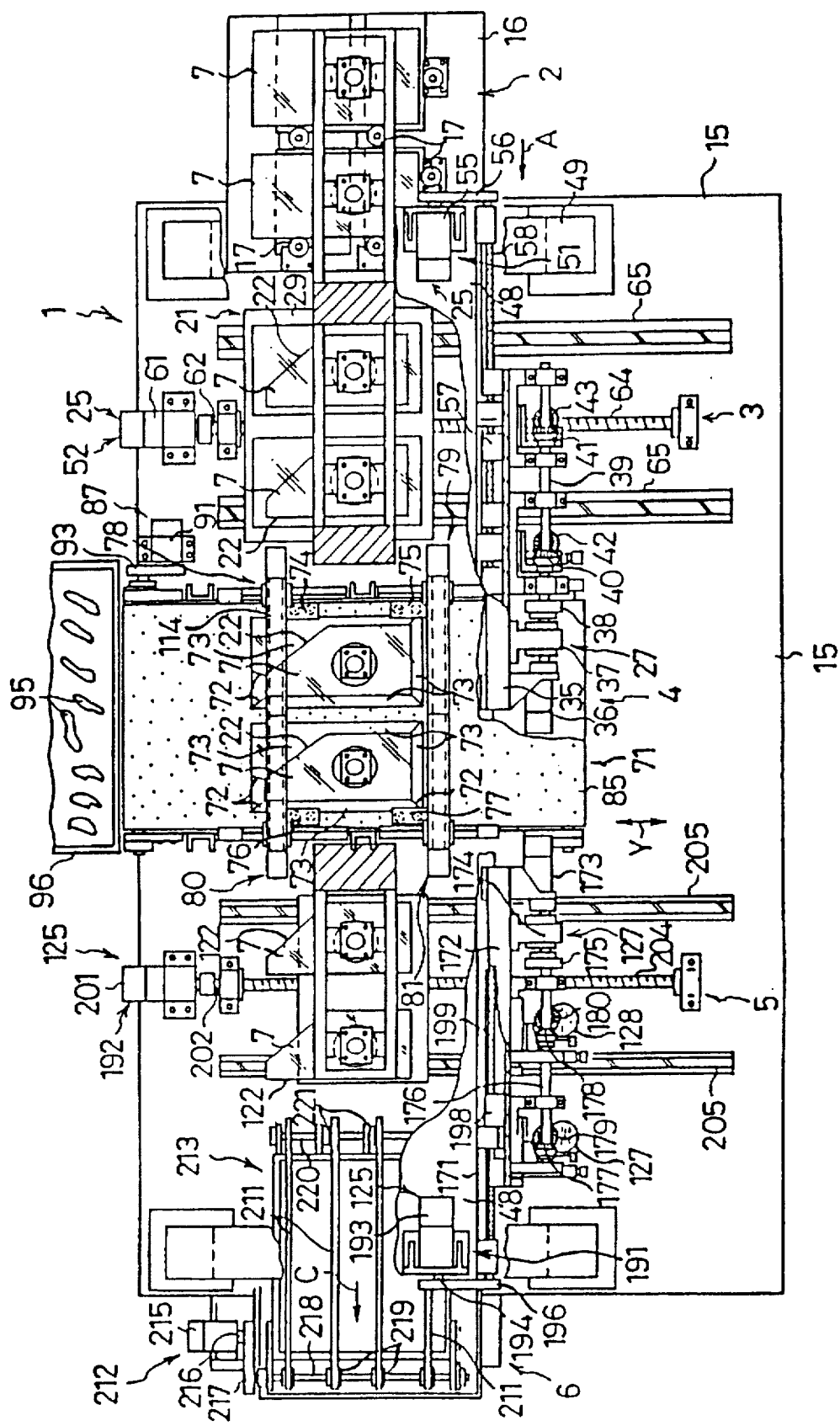
FIG. 2 is a partially cutaway plan view of the embodiment shown in FIG. 1.
Figure 3:
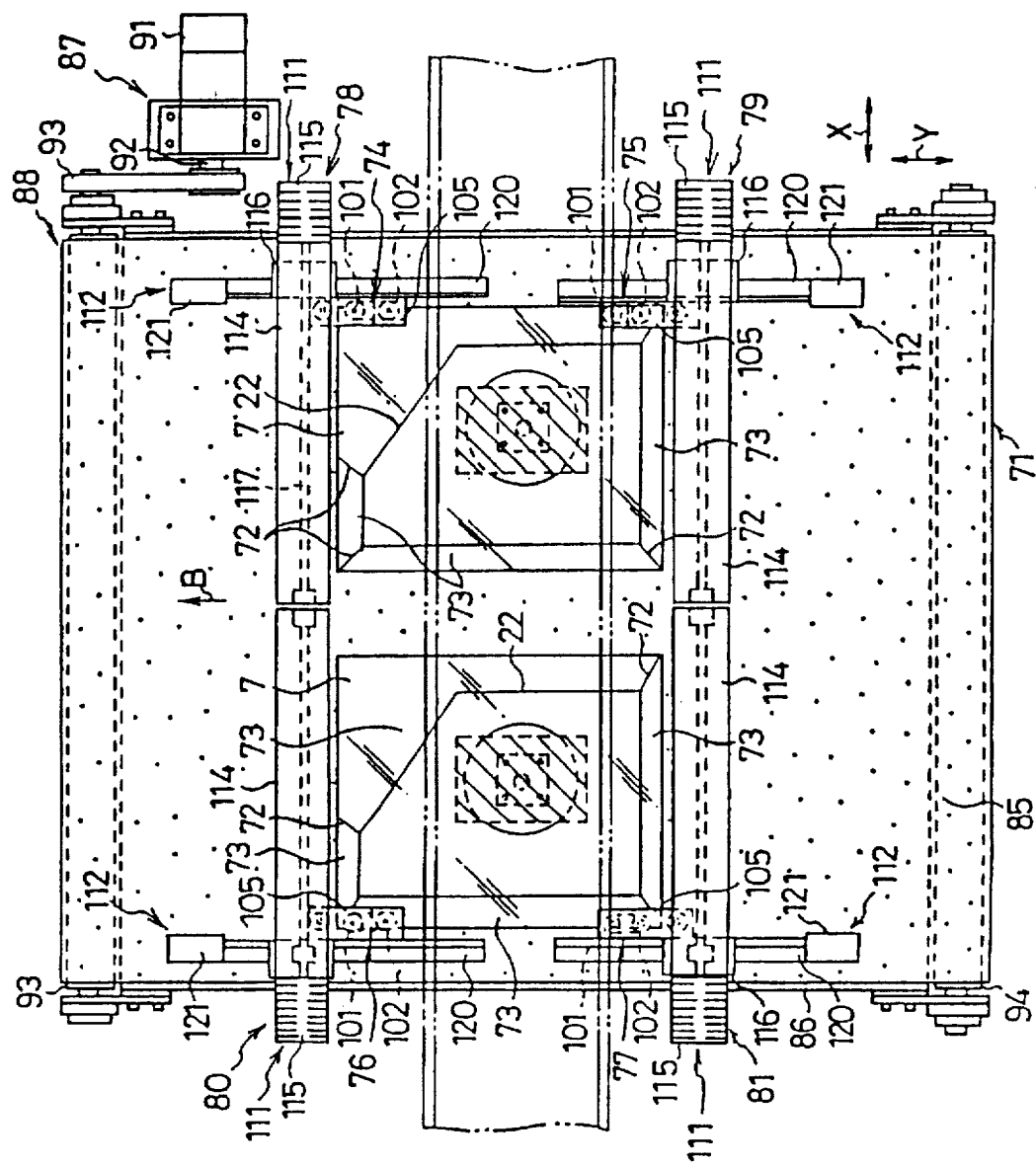
FIG. 3 is a plan view of a glass plate bend-breaking section in accordance with the embodiment shown in FIG. 1.

In FIGS. 1 to 3, a glass-plate working apparatus 1 in accordance with this embodiment comprises a glass plate carrying-in section 2; a main cut-line forming section 3 disposed in proximity to the glass plate carrying-in section 2; a glass plate bend-breaking section 4 disposed in proximity to the main cut-line forming section 3; a glass plate peripheral-edge grinding section 5 disposed in proximity to the glass plate bend-breaking section 4; and a glass plate carrying-out section 6 disposed in proximity to the glass plate peripheral-edge grinding section 5. Each of the main cut-line forming section 3, the glass plate bend-breaking section 4, and the glass plate peripheral-edge grinding section 5 is arranged to concurrently process two glass plates 7 at a time.

The glass-plate working apparatus 1 is further provided with a transporting device 11 for concurrently transporting two glass plates 7, which are to be processed or have been processed, from the glass plate carrying-in section 2 to the main cut-line forming section 3, from the main cut-line forming section 3 to the glass plate bend-breaking section 4, from the glass plate bend-breaking section 4 to the glass plate peripheral-edge grinding section 5, from the glass plate peripheral-edge grinding section 5 to the glass plate carrying-out section 6, respectively. The transporting device 11 is so constructed as to transport the two glass plates 7 arranged in series in a transporting direction A, and the main cut-line forming section 3, the glass plate bend-breaking section 4, and the glass plate peripheral-edge grinding section 5 are respectively arranged to concurrently process the two glass plates 7 arranged in series in the transporting direction A.

The glass plate carrying-in section 2 has, among others, a supporting base 16 attached to a base 15 as well as rollers 17 which are rotatably attached to the supporting base 16 so as to position the respective two glass plates 7, i.e., unworked plate glass, which are placed on the supporting base 16 and arranged in series in the transporting direction A.

The main cut-line forming section 3 is comprised of a supporting device 21 for supporting the glass plates 7 from the glass plate carrying-in section 2; two main cut-line forming heads 23 and 24 for forming main cut lines 22 for bend-breaking on the respective glass plates 7 supported by the supporting device 21; a common moving device 25 for relatively moving the two main cut-line forming heads 23 and 24 with respect to the glass plates 7 in correspondence with the main cut lines 22 for bend-breaking to be formed; and a common blade orienting device 27 for orienting the blade of a cutter wheel 26 of each of the main cut-line forming heads 23 and 24 in the main cut-line forming direction. The supporting device 21 is constituted by a supporting base 29 attached to a slider 28.

Since the main cut-line forming heads 23 and 24 are formed in a mutually similar manner, a description will be given hereafter of only the main cut-line forming head 23. Similar portions of the main cut-line forming head 24 will be denoted by corresponding reference numerals, and a description thereof will be omitted. The main cut-line forming head 23 is provided with the cutter wheel 26 and a pneumatic cylinder unit 31 having a piston rod with the cutter wheel 26 attached to a distal end thereof. The pneumatic cylinder unit 31 is mounted on a bracket 32 by means of an adjusting mechanism for adjusting the initial position of the cutter wheel 26 in the X-Y direction. When the pneumatic cylinder unit 31 of the main cut-line forming head 23 is actuated, and its piston rod is hence extended, the cutter wheel 26 is pressed against the glass plate 7 placed on the supporting base 29, thereby forming the main cut line 22.

The blade orienting device 27 is constituted by a rotating device for rotating the main cut-line forming heads 23 and 24 in an R direction about a Z1 axis and a Z2 axis which are perpendicular to the plane of movement of the main cut-line forming heads 23 and 24 by the moving device 25, i.e., the X-Y plane in this example. The blade orienting device 27 is comprised of a slider 35 fitted to a pair of guide rails 34, which extend in the X direction in parallel to each other, in such a manner as to be movable in the X direction; an electric motor 36 supported by the slider 35; a rotating shaft 39 rotatably supported by the slider 35 and connected to an output rotating shaft of the electric motor 36 via a reducing gear 37, a pulley and a timing belt 38; bevel gears 40 and 41 secured to the rotating shaft 39; and Z-axis members 46 and 47 rotatably supported by the slider 35 by means of bearings 44 and 45, respectively, the Z-axis embers 46 and 47 being respectively secured at upper ends thereof with bevel gears 42 and 43 respectively meshing with the bevel gears 40 and 41, and at lower ends thereof with the bracket 32. The pair of guide rails 34 are mounted on an upper frame 48, and the upper frame 48 is supported by the base 15 by means of a vertical frame 49.

As for the blade orienting device 27, as the electric motor 36 is operated, the rotating shaft 39 is rotated by means of its output rotating shaft, the reducing gear 37, the pulley and the timing belt 38. As the rotating shaft 39 is thus rotated, the Z-axis members 46 and 47 are respectively rotated about the Z1 axis and the Z2 axis in the R direction by means of the bevel gears 40 and 41 and the bevel gears 42 and 43. Then, the main cut-line forming heads 23 and 24 mounted on the bracket 32 are respectively rotated concurrently about the Z1 axis and the Z2 axis in the R direction. At the time of the formation of the main cut lines 22, the blades of the respective cutter wheels 26 of the main cut-line forming heads 23 and 24 are oriented in the direction in which the main cut lines 22 are formed.

The moving device 25 is provided with an X-direction moving unit 51 for moving the main cut-line forming heads 23 and 24 in the X-direction and a Y-direction moving unit 52 for moving the glass plates 7 in the Y-direction. The X-direction moving unit 51 has an electric motor 55 mounted on the upper frame 48 as well as a screw shaft 58 which is rotatably supported by the upper frame 48 and is threadedly engaged with nuts 57 secured to the slider 35, the rotation of an output shaft of the electric motor 55 being transmitted to the screw shaft 58 by means of a pulley and a belt 56 and the like. As the electric motor 55 is operated, and its output rotating shaft is rotated, the screw shaft 58 is rotated by means of the pulley and the belt 56 and the like so as to move the slider 35 in the X direction and to move the main cut-line forming heads 23 and 24 mounted on the slider 35 by means of the Z-axis members 46 and 47 and the bracket 32 in the X direction.

The Y-direction moving unit 52 has an electric motor 61 mounted on the base 15 as well as a screw shaft 64 which is connected to an output rotating shaft 62 of the electric motor 61 and is threadedly engaged with nuts 63 secured to the slider 28. The slider 28 is mounted movably in the Y direction on a pair of guide rails 65 extending in the Y direction in parallel to each other and disposed on the base 15. The screw shaft 64 is rotatably disposed on the base 15. As for the Y-direction moving unit 52, as the electric motor 61 is operated, and its output shaft 62 is rotated, the screw shaft 64 is rotated to move the slider 28 in the Y direction. As the slider 28 is thus moved in the Y direction, the main cut-line forming heads 23 and 24 are relatively moved in the Y direction with respect to the glass plates 7 placed on the supporting base 29 supported by the slider 28.

The glass plate bend-breaking section 4 is provided with a supporting device 71 for supporting the glass plates 7 from the main cut-line forming section 3; four bend-breaking heads 74, 75, 76, and 77 for forming edge cut lines 72 for bend-breaking on the glass plates 7 supported by the supporting device 71, and for pressing predetermined positions 73, 73, . . . on the glass plates 7 on which the cut lines 22 and 72 have been formed, so as to bend-break the glass plates 7; and bend-breaking head moving devices 78, 79, 80, and 81 for relatively moving the bend-breaking heads 74, 75, 76, and 77, respectively, with respect to the glass plates 7 supported by the supporting device 71, in correspondence with the edge cut lines 72 for bend-breaking which are to be formed as well as the predetermined positions 73, 73, . . . on the glass plates 6 to be pressed.

The supporting device 71 is provided with a belt conveyor 88 having a flexible endless belt 85, a plate-like supporting member 86 for supporting the endless belt 85 on the reverse side thereof, and a traveling device 87 for traveling the endless belt 85. The traveling device 87 is provided with an electric motor 91 mounted on the base 15, a driving drum 93 connected to an output rotating shaft 92 of the electric motor 91 by means of a pulley and a belt 93 and the like and rotatably supported by the base 15, and a driven drum 94 rotatably supported by the base 15. The endless belt 85 is trained between the driving drum 93 and the driven drum 94. In the supporting device 71 in which the glass plates 7 subject to bend-breaking are placed on the endless belt 85, after completion of one bend-breaking operation, if the endless belt 85 is made to travel in a B direction by the rotation of the output rotating shaft 92 due to the operation of the electric motor 91, bend-broken scrap 95 (cullet) remaining on the endless belt 85 is discharged toward a chute (not shown). As a result, after the completion of one bend-breaking operation, the bend-broken scrap 95 slides on the chute, and is discharged into a bend-broken-scrap storing box 96.

Since the bend-breaking heads 74, 75, 76, and 77 are formed in a mutually similar manner, respectively, a description will be given hereafter of only the bend-breaking head 74. Similar portions of the bend-breaking heads 75, 76, and 77 will be denoted by corresponding reference numerals, and a description thereof will be omitted. The bend-breaking head 74 is provided with a cutter device 101 for forming the edge cut line, as well as a press-breaking device 102 for press-breaking the glass plates 7. Although the cutter device 101 is not illustrated in detail, the cutter device 101 is arranged in the same way as the main cut-line forming head 23, and is provided with a cutter wheel and a pneumatic cylinder unit having a piston rod with the cutter wheel attached to a distal end thereof. The press-breaking device 102 is provided with a pressing member 103 and a pneumatic cylinder unit 104 having a piston rod with the pressing member 103 attached to a distal end thereof. The pneumatic cylinder unit of the cutter device 101 and the pneumatic cylinder unit 104 of the press-breaking device 102 are mounted on a common slider 105.

As for the cutter device 101, when its pneumatic cylinder unit is actuated, and its piston rod is hence extended, the cutter wheel is pressed against the glass plates 7 placed on the endless belt 85, thereby forming the edge cut lines 72. When the pneumatic cylinder unit 104 of the press-breaking device 102 is actuated, and its piston rod is hence extended, the pressing member 103 is pressed against the positions 73, 73, . . . on the glass plates 7 placed on the endless belt 85, thereby slightly straining the glass plates 7 and bend-breaking the glass plates 7 along the cut lines 22 and 72. Although the cutter device 101 is not illustrated, the cutter device 101 is provided with a blade orienting device for orienting the blade of the cutter wheel in the direction in which the cut lines are formed.

Since the bend-breaking head moving devices 78, 79, 80, and 81 are formed in a mutually similar manner, a description will be given hereafter of only the bend-breaking head moving device 78. Similar portions of the bend-breaking head moving devices 79, 80, and 81 will be denoted by corresponding reference numerals, and a description thereof will be omitted. The bend-breaking head moving device 78 relatively moves the bend-breaking head 74 in the X-Y plane with respect to one of the glass plates 7 supported by the supporting device 71. The bend-breaking head moving device 78 is provided with an X-direction moving unit 111 for moving the bend-breaking head device 74 in the X direction as well as a Y-direction moving unit 112 for moving the bend-breaking head device 74 in the Y direction. The X-direction moving unit 111 has a frame 114 extending in the X direction and mounted on a slider 113, an electric motor 115 provided at one end of the frame 114, as well as a screw shaft 117 which is connected to an output rotating shaft of the electric motor 115, is rotatably disposed on the frame 114, and is threadedly engaged with nuts secured to a slider 116. The slider 116 is suspended by being fitted in a pair of guide rails (not shown) which extend in the X direction in parallel to each other and are attached to the frame 114, such that the slider 116 is movable in the X direction. The screw shaft 117 is rotatably supported by the frame 114. As for the X-direction moving unit 111, the electric motor 115 is operated to rotate its output rotating shaft so as to rotate the screw shaft 117. As the screw shaft 117 is rotated, the slider 116 is moved in the X direction, and the bend-breaking head 74 is also moved in the X direction by means of the slider 105.

The Y-direction moving unit 112 has a frame 120 mounted on the slider 116 and extending in the Y direction, an electric motor 121 provided at one end of the frame 120, as well as a screw shaft (not shown) which is connected to an output rotating shaft of the electric motor 121, is rotatably disposed on the frame 120, and is threadedly engaged with nuts secured to the slider 105. The slider 105 is fitted in a pair of guide rails which extend in the Y direction in parallel to each other and are attached to the frame 120, such that the slider 105 is movable in the Y direction. As for the Y-direction moving unit 112, the electric motor 121 is operated to rotate its output rotating shaft so as to rotate the screw shaft. As the screw shaft is rotated, the slider 105 is moved in the Y direction, and the bend-breaking head 74 is also moved in the Y direction by means of the slider 105.

The bend-breaking heads 74 and 75 and the bend-breaking head moving devices 78 and 79 are allotted to predetermined areas of one glass plate 7 to effect the formation of the edge cut lines 72 and the press-breaking operation. Meanwhile, the bend-breaking heads 76 and 77 and the bend-breaking head moving devices 80 and 81 are allotted to predetermined areas of the other glass plate 7 to effect the formation of the edge cut lines 72 and the press-breaking operation.

The glass plate peripheral-edge grinding section 5 is provided with a supporting device 121 for supporting the glass plates 7 from the glass plate bend-breaking section 4; two grinding heads 123 and 124 for grinding respective bend-broken edges 122 of the glass plates 7 supported by the supporting device 121; a common grinding-head moving device 125 for relatively moving the grinding heads 123 and 124 with respect to the glass plates 7 supported by the supporting device 121, in correspondence with the bend-broken edges 122 of the glass plates 7 to be ground; and common center orienting devices 127 for orienting the rotational centers of respective grinding wheels 126 of the grinding heads 123 and 124 in tangential directions at grinding points on the glass plates 7.

The supporting device 121 has a slider 131 and two vacuum sucking units 132 and 133 provided on the slider 131, and sucks, supports, and fixes the respective glass plates 7 from the glass plate bend-breaking section 4 by means of the corresponding vacuum sucking units 132 and 133 during the grinding and polishing of their bend-broken edges 122.

Since the grinding heads 123 and 124 are arranged in a mutually similar manner, a description will be given hereafter of only the grinding head 123. Similar portions of the grinding head 124 will be denoted by corresponding reference numerals, and a description thereof will be omitted. The grinding head 123 is provided with a grinding wheel 126 and an electric motor 127 having an output rotating shaft to a lower end of which the grinding wheel 126 is secured, so as to rotate the grinding wheel 126. The electric motor 127 is mounted on a bracket 129 by means of an adjusting mechanism 128 for adjusting the initial position of the grinding wheel 126 in the X-Y-Z direction. As the grinding wheel 126 is rotated due to the operation of the electric motor 127, the grinding head 123 grinds and polishes the bend-broken edge 122 of the glass plate 7.

The center orienting devices 127 are each constituted by a grinding-head rotating device for rotating the grinding heads 123 and 124 in the R direction about a Z3 axis and a Z4 axis which are perpendicular to the plane of movement of the grinding heads 123 and 124 by the grinding-head moving device 125, i.e., the X-Y plane in this example. The center orienting device 127 is provided with a slider 172 fitted to a pair of guide rails 171, which extend in the X direction in parallel to each other, in such a manner as to be movable in the X direction; an electric motor 173 supported by the slider 172; a rotating shaft 176 rotatably supported by the slider 172 and connected to an output rotating shaft of the electric motor 173 via a reducing gear 174, a pulley and a timing belt 175; bevel gears 177 and 178 secured to the rotating shaft 176; and Z-axis members 183 and 184 rotatably supported by the slider 172 by means of bearings 181 and 182, the Z-axis members 183 and 184 being respectively secured at upper ends thereof with bevel gears 179 and 180 respectively meshing with the bevel gears 177 and 178, and at lower ends thereof with the bracket 129. The pair of guide rails 171 are mounted on the upper frame 48.

As for the center orienting device 127, as the electric motor 173 is operated, the rotating shaft 176 is rotated by means of its output rotating shaft, the reducing gear 174, and the pulley and the timing belt 175. As the rotating shaft 176 is thus rotated, the Z-axis members 183 and 184 are respectively rotated about the Z3 axis and the Z4 axis in the R direction by means of the bevel gears 177, 178, 179, and 180. Then, the grinding heads 123 and 124 mounted on the bracket 129 are respectively rotated about the Z3 axis and the Z4 axis in the R direction. At the time of the grinding and polishing of the bend-broken edge 122, the grinding wheels 126 are each oriented such that the center of rotation of the relevant grinding wheel 126 is located above the normal line of the bend-broken edge 122 at the grinding and polishing position.

The grinding-head moving device 125 is provided with an X-direction moving unit 191 for moving the grinding heads 123 and 124 in the X-direction and a Y-direction moving unit 192 for moving the glass plates 7 in the Y-direction. The X-direction moving unit 191 has an electric motor 193 mounted on the upper frame 48 as well as a screw shaft 199 which is rotatably supported by the upper frame 48 and is threadedly engaged with nuts 198 secured to the slider 172, the rotation of an output shaft 194 of the electric motor 193 being transmitted to the screw shaft 199 by means of a pulley and a belt 196. As the electric motor 193 is operated, and its output shaft 194 is rotated, the screw shaft 199 is rotated by means of the pulley and the belt 196 so as to move the slider 172 in the X direction and to move the grinding heads 123 and 124 mounted on the slider 172 by means of the Z-axis members 183 and 184 and the bracket 129 in the X direction.

The Y-direction moving unit 192 has an electric motor 201 mounted on the base 15 as well as a screw shaft 204 which is connected to an output rotating shaft 202 of the electric motor 201 and is threadedly engaged with nuts 203 secured to the slider 131. The slider 131 is mounted movably in the Y direction on a pair of guide rails 205 extending in the Y direction in parallel to each other and disposed on the base 15. The screw shaft 204 is rotatably disposed on the base 15. As for the Y-direction moving unit 192, as the electric motor 201 is operated, and its output shaft 202 is rotated, the screw shaft 204 is rotated to move the slider 131 in the Y direction. As the slider 131 is thus moved in the Y direction, the grinding heads 123 and 124 are relatively moved in the Y direction with respect to the glass plates 7 placed on the vacuum sucking units 132 and 133 supported by the slider 131.

The glass plate carrying-out section 6 is provided with a belt conveyor 213 having a plurality of flexible endless narrow belts 211 disposed in parallel to each other and a traveling device 212 for causing the endless belts 211 to travel. The traveling device 212 is provided with an electric motor 215 mounted on a frame 214 on the side of the base 15; a plurality of drive rollers 219 connected to an output rotating shaft 216 of the electric motor 215 via a pulley and a belt 217 and the like and rotatably supported on the frame 214 by means of a shaft 218; and a plurality of driven rollers 221 rotatably supported on the frame 214 by means of a shaft 220. The endless narrow belts 211 are trained between the drive rollers 219 and the driven rollers 221. As for the glass plate carrying-out section 6, as the electric motor 215 is operated, and its output rotating shaft 216 is rotated, the shaft 218 is rotated by means of the belt 217 so as to move the endless narrow belts 211 in the C direction and to carry out the glass plates 7 placed on the endless narrow belts 211 from the glass plate peripheral-edge grinding section 5 in the C direction.

The transporting device 11 is provided with eight lifting devices 232 to 239 respectively mounted on the slider 113 by means of a bracket 230 and the like as well as a moving device 240 for moving the slider 113 in the X direction. Each of the lifting devices 232 to 239 has a vacuum suction head 241 for sucking and holding the glass plate 7 under a vacuum and a pneumatic cylinder unit 242 having a piston rod in which the vacuum suction head 241 is attached to a distal end thereof, so as to raise and lower the vacuum suction head 241 when the pneumatic cylinder unit 242 is actuated. The slider 113 is fitted movably in the X direction to a pair of guide rails extending in the X direction in parallel to each other and disposed on the underside of the upper frame 48.

The moving device 240 has an electric motor 251 mounted on the upper frame 48 as well as a screw shaft 254 which is rotatably supported by the underside of the upper frame 48 and is threadedly engaged with nuts secured to the slider 113, the rotation of an output shaft of the electric motor 251 being transmitted to the screw shaft 254 by means of a pulley and a belt 253 and the like. As the electric motor 251 is operated, and its output rotating shaft is rotated, the screw shaft 254 is rotated by means of the pulley and the belt 253 so as to move the slider 113 in the X direction and to move the lifting devices 232 to 239 mounted on the slider 113 by means of the bracket 230 and the like in the X direction.

As a result of the movement in the X direction of the lifting devices 232 to 239 by the moving device 240 and the sucking, holding, and lifting of the glass plates 7 by the lifting devices 232 to 239, the glass plates 7 supplied onto the supporting base 16 are transported onto the supporting base 29, the glass plates 7 which are placed on the supporting base 29 and on which the main cut lines 22 have been formed are transported onto the endless belt 85, the bend-broken glass plates 7 on the endless belt 85 are transported onto the vacuum sucking units 132 and 133, and the glass plates 7 which are placed on the vacuum sucking units 132 and 133 and whose edges 122 have been ground and polished are transported onto the endless narrow belts 211. The placing onto the supporting base 29 of the glass plates 7 supplied onto the supporting base 16 is effected by the lifting devices 232 and 233; the placing onto the endless belt 85 of the glass plates 7 which are placed on the supporting base 29 and on which the main cut lines 22 have been formed is effected by the lifting devices 234 and 235; the placing onto the vacuum sucking units 132 and 133 of the bend-broken glass plates 7 on the endless belt 85 is effected by the lifting devices 236 and 237; and the placing onto the endless narrow belts 211 of the glass plates 7 which are placed on the vacuum sucking units 132 and 133 and whose edges 122 have been ground and polished is effected by the lifting devices 238 and 239.

It should be noted that the glass-plate working apparatus 1 is provided with a numerical controller in addition to the above-described devices. The numerical controller controls the above-described operation and the operation which will be described below, by a program which has been stored in advance.

The two glass plates 7 are first positioned and placed on the supporting base 16 of the glass plate carrying-in section 2 by means of the rollers 17 and the like. As a result of the reciprocating motion in the X direction of the slider 113 of the transporting device 11, the glass plates 7 placed on the supporting base 16 are transported onto the supporting base 29; the glass plates 7 which are placed on the supporting base 29 and on which the main cut lines 22 have been formed are transported onto the endless belt 85; the bend-broken glass plates 7 placed on the endless belt 85 are transported onto the vacuum sucking units 132 and 133; and the glass plates 7 which are placed on the vacuum sucking units 132 and 133 and whose edges 122 have been ground and polished are transported onto the endless narrow belts 211.

In the main cut-line forming section 3, each of the main cut-line forming heads 23 and 24 actuates the pneumatic cylinder unit 31 to press the cutter wheel 26 against the glass plate 7 placed on the supporting base 29. In the state in which the cutter wheel 26 is pressed against the glass plate 7, the moving device 25 moves the respective one of the main cut-line forming heads 23 and 24 in the X direction by means of the X-direction moving unit 51, and moves the glass plate 7 placed on the supporting base 29 in the Y direction by means of the Y-direction moving unit 52. Consequently, the preprogrammed main cut line 22 is formed on the glass plate 7 placed on the supporting base 29 by means of the cutter wheel 26. During the formation of the cut line 22, the electric motor 36 is operated to orient the blade of the cutter wheel 26 in the direction in which the main cut line 22 is formed. After all the main cut lines 22 have been formed, the pneumatic cylinder unit 31 is actuated to raise the cutter wheel 26, thereby setting the operation in the initial state.

In the glass plate bend-breaking section 4, as a result of the lowering of the cutter wheel of the cutter device 101 as well as the movement of the bend-breaking head 74 in the X and Y directions due to the operation of the X-direction moving device 111 and the Y-direction moving device 112, the preprogrammed edge cut lines 72 are formed on the glass plates 7 placed on the endless belt 85 by the cutter wheel of the cutter device 101. After the formation of the edge cut lines 72, the pressing member 103 is pressed against the preprogrammed positions 73, 73, . . . on the glass plates 7 placed on the endless belt 85 by the projection and retraction of the pressing member 103 due to the actuation of the pneumatic cylinder unit 104 of the press-breaking device 102 and by the movement of the bend-breaking head 74 in the X and Y directions due to the operation of the X-direction moving unit 111 and the Y-direction moving unit 112. Consequently, the glass plates 7 placed on the endless belt 85 are slightly strained, and are bend-broken along the cut lines 22 and 72.

In the glass plate peripheral-edge grinding section 5, the vacuum sucking units 132 and 133 suck under a vacuum and fix the glass plates 7 from the glass plate bend-breaking section 4, and the grinding heads 123 and 124 operate their respective electric motors 127 to rotate the grinding wheels 126. In the state in which the grinding wheels 126 are rotating, the grinding-head moving device 125 moves the grinding heads 123 and 124 in the X direction by means of the X-direction moving unit 191, and moves the glass plates 7 fixed on the vacuum sucking units 132 and 133 in the Y direction by means of the Y-direction moving unit 192. Consequently, the bend-broken edges 122 of the glass plates 7 fixed on the vacuum sucking units 132 and 133 are subjected to preprogrammed grinding and polishing by the grinding wheels 126. During the grinding and polishing operations, the center orienting device 127 is operated, and the grinding heads 123 and 124 are rotated such that the respective centers of rotation of the grinding wheels 126 of the grinding heads 123 and 124 are located above the normal lines of the bend-broken edges 122 at the grinding and polishing positions.

After the respective completion of formation of main cut lines on the glass plates 7 in the main cut-line forming section 3, the operation of bend-breaking the glass plates 7 in the glass plate bend-breaking section 4, and the operation of grinding and polishing the bend-broken edges 122 in the glass plate peripheral-edge grinding section 5, the transporting device 11 is operated again, and glass plates 7 on which the main cut lines are to be formed, glass plates 7 subject to bend-breaking, and glass plates 7 subject to grinding and polishing are newly transported onto the supporting base 29, the endless belt 31, and the vacuum sucking units 132 and 133, respectively. During the operation of the transporting device 11, as the endless belt 85 travels due to the operation of the electric motor 91, the bend-broken scrap 95 (cullet) remaining on the endless belt 85 is fed toward the chute, and slides on the chute so as to be discharged into the bend-broken-scrap storing box 96.

In accordance with the above-described present invention, it is possible to provide a glass-plate working apparatus which is capable of concurrently effecting the formation of a main cut line, bend-breaking, and peripheral-edge grinding with respect to a multiplicity of glass plates, thereby making it possible to reduce the working time and improve productivity, and which is capable of effecting a multiple operation in the bend-breaking section which requires a relatively long working time, thereby making it possible to further reduce the working time and improve productivity.

I claim:

1. A glass-plate working apparatus comprising:

a glass plate carrying-in section;

a main cut-line forming section disposed in proximity to said glass plate carrying-in section;

a glass plate bend-breaking section disposed in proximity to said main cut-line forming section;

a glass plate peripheral-edge grinding section disposed in proximity to said glass plate bend-breaking section; and a glass plate carrying-out section disposed in proximity to the glass plate peripheral-edge grinding section;

each of said main cut-line forming section, said glass plate bend-breaking section, and said glass plate peripheral-edge grinding section being arranged to concurrently process at least two glass plates;

said main cut-line forming section including at least two main cut-line forming heads and a first common moving device for relatively moving said at least two main cut-line forming heads with respect to the respective glass plates in an X-Y plane;

said glass plate bend-breaking section including at least two bend-breaking heads for the glass plates to be bend-broken, each of said bend-breaking heads having a cutter device for forming an edge cut-line on the glass plate and a press-breaking device for press-breaking the glass plate along the main cut-line and the edge cut-line, and a bend-breaking head moving device for automatically moving each of said bend-breaking heads in correspondence with a corresponding one of the glass plates to be bend-broken in the X-Y plane;

said glass plate peripheral-edge grinding section including at least two grinding heads and a second common moving device for relatively moving said at least two grinding heads with respect to the respective glass plates in the X-Y plane;

said first and second common moving devices and said automatically bend-breaking head moving device being disposed in the respective sections independently of each other such that said main cut-line forming heads, said bend-breaking heads and said grinding heads are moved in the X-Y plane independently of each other by means of the respective moving devices.

2. A glass-plate working apparatus according to claim 1, further comprising a transporting device for concurrently transporting at least two glass plates from said glass plate carrying-in section to said main cut-line forming section, from said main cut-line forming section to said glass plate bend-breaking section, from said glass plate bend-breaking section to said glass plate peripheral-edge grinding section, and from said glass plate peripheral-edge grinding section to said glass plate carrying-out section, respectively.

3. A glass-plate working apparatus according to claim 2, wherein said transporting device is constructed to transport the at least two glass plates arranged in series in a transporting direction, and said main cut-line forming section, said glass plate bend-breaking section, and said glass plate peripheral-edge grinding section are respectively arranged to concurrently process the at least two glass plates arranged in series in the transporting direction.

4. A glass-plate working apparatus according to claim 1, wherein each of said main cut-line forming heads is provided with a cutter for forming a main cut-line by coming into contact with the glass plate, and said main cut-line forming section is provided with a common blade orienting device for orienting a blade of each of said cutters of said main cut-line forming heads in a main cut-line forming direction.

5. A glass-plate working apparatus according to claim 4, wherein said blade orienting device has a rotating device for rotating each of said main cut-line forming heads about an axis perpendicular to a plane of relative movement of each of said main cut-line forming heads with respect to the glass plate.

6. A glass-plate working apparatus according to claim 1, wherein each of said grinding heads is provided with a grinding wheel for grinding a bend-broken edge when in contact with the bend-broken edge of the glass plate while the wheel is rotating, and said glass plate peripheral-edge grinding section has a center orienting device for orienting a center of rotation of each of said grinding wheels in a tangential direction at a grinding point with respect to the glass plate.

7. A glass-plate working apparatus according to claim 6, wherein said center orienting device has a common rotating device for rotating said grinding heads about an axis perpendicular to a plane of relative movement of said grinding heads with respect to the glass plate.

* * * * *

UNITED STATES PATENT AND TRADEMARK OFFICE
CERTIFICATE OF CORRECTION

PATENT NO. : 5,759,222
DATED : June 2, 1998
INVENTOR(S) : SHIGERU BANDO

It is certified that error appears in the above-identified patent and that said Letters Patent is hereby corrected as shown below:

On the title page item[30]:

Feb. 24, 1995 [JP] Japan..............................7-061942      should be corrected to read:

Signed and Sealed this

Eighth Day of September, 1998

Attest:

BRUCE LEHMAN

*Attesting Officer*      *Commissioner of Patents and Trademarks*